United States Patent
Wilder (10) Patent No.: US 10,102,358 B2
(45) Date of Patent: Oct. 16, 2018

(54) FACE-CONTROLLED LIVENESS VERIFICATION

(71) Applicant: Sensory, Incorporated, Santa Clara, CA (US)

(72) Inventor: Matthew Wilder, Boulder, CO (US)

(73) Assignee: Sensory, Incorporated, Santa Clara, CA (US)

( * ) Notice: Subject to any disclaimer, the term of this patent is extended or adjusted under 35 U.S.C. 154(b) by 121 days.

(21) Appl. No.: 14/983,238

(22) Filed: Dec. 29, 2015

(65) Prior Publication Data

US 2017/0185760 A1     Jun. 29, 2017

(51) Int. Cl.
    G06F 21/32    (2013.01)
    G06F 21/36    (2013.01)

(52) U.S. Cl.
    CPC .............. *G06F 21/32* (2013.01); *G06F 21/36* (2013.01)

(58) Field of Classification Search
    USPC ........................................................... 726/19
    See application file for complete search history.

(56) References Cited

U.S. PATENT DOCUMENTS

| | | | | |
|---|---|---|---|---|
| 6,498,912 B1* | 12/2002 | Leni | ........................ | G03G 21/02 399/1 |
| 7,797,549 B2* | 9/2010 | Main | ........................ | G06F 21/14 340/5.26 |
| 8,457,367 B1* | 6/2013 | Sipe | .................... | G06K 9/00221 382/118 |
| 8,856,541 B1* | 10/2014 | Chaudhury | ............. | G06F 21/32 382/115 |
| 9,189,825 B2* | 11/2015 | Im | ......................... | G06T 1/0007 |
| 9,219,720 B1* | 12/2015 | Satpathy | ................. | H04L 63/08 |
| 9,607,138 B1* | 3/2017 | Baldwin | ................. | G06F 21/32 |
| 9,614,840 B2* | 4/2017 | Tsou | .................... | H04L 63/0861 |
| 9,686,442 B2* | 6/2017 | Onishi | .................... | H04N 1/442 |
| 2010/0205667 A1* | 8/2010 | Anderson | ............... | G06F 3/013 726/19 |
| 2011/0261201 A1* | 10/2011 | Fujii | ......................... | B60R 1/00 348/148 |
| 2013/0239191 A1* | 9/2013 | Bostick | ................. | G06F 21/316 726/7 |
| 2014/0002444 A1* | 1/2014 | Bennett | .................... | G06F 3/012 345/419 |
| 2014/0015930 A1* | 1/2014 | Sengupta | ........... | G06K 9/00771 348/46 |

(Continued)

*Primary Examiner* — Taghi Arani
*Assistant Examiner* — Badri Champakesan
(74) *Attorney, Agent, or Firm* — Fountainhead Law Group P.C.

(57) ABSTRACT

Techniques for implementing face-controlled liveness verification are provided. In one embodiment, a computing device can present, to a user, a sequential series of targets on a graphical user interface (GUI) of the computing device, where each target is a visual element designed to direct the user's attention to a location in the GUI. The computing device can further determine whether the user has successfully hit each target, where the determining comprises tracking movement of a virtual pointer controlled by the user's gaze or face pose and checking whether the user has moved the virtual pointer over each target. If the user has successfully hit each target, the computing device can conclude that the user is a live subject.

13 Claims, 6 Drawing Sheets

(56) References Cited

U.S. PATENT DOCUMENTS

| | | | | |
|---|---|---|---|---|
| 2014/0123275 A1* | 5/2014 | Azar | .................... | H04W 12/06 |
| | | | | 726/19 |
| 2014/0201126 A1* | 7/2014 | Zadeh | .................... | G06K 9/627 |
| | | | | 706/52 |
| 2014/0289834 A1* | 9/2014 | Lindemann | ............ | G06Q 20/42 |
| | | | | 726/7 |
| 2014/0337948 A1* | 11/2014 | Hoyos | ................. | H04L 63/0861 |
| | | | | 726/7 |
| 2015/0135309 A1* | 5/2015 | Karmarkar | .............. | G06F 21/36 |
| | | | | 726/19 |
| 2015/0161434 A1* | 6/2015 | Ross | ................. | G06K 9/00288 |
| | | | | 382/118 |
| 2015/0227735 A1* | 8/2015 | Chappell | ................ | G06F 21/32 |
| | | | | 726/19 |
| 2016/0063235 A1* | 3/2016 | Tussy | ..................... | G06F 21/32 |
| | | | | 726/6 |
| 2016/0112414 A1* | 4/2016 | Tsou | .................. | H04L 63/0861 |
| | | | | 726/7 |
| 2016/0150260 A1* | 5/2016 | Ovide | ................ | H04N 21/2668 |
| | | | | 725/12 |
| 2016/0225203 A1* | 8/2016 | Asmar | ............... | G07C 9/00309 |

* cited by examiner

FACE-CONTROLLED LIVENESS VERIFICATION

BACKGROUND

Face based biometric authentication systems operate by capturing images of a user's face at a point of authentication (e.g., at a time the user attempts to access a secured resource, such as a device or application) and analyzing the captured images against one or more enrolled facial templates in order to verify the identity of the user. Since these systems generally rely on comparing static facial features between the captured images and the facial templates, they are vulnerable to replay attacks. In such an attack, an imposter presents a still photograph or video of an enrolled user's face to a face based authenticator, with the hopes that the authenticator will mistake the photograph or video for the actual enrolled user. If the authenticator is not able to detect/verify the "liveness" of the presented face (i.e., determine whether the face belongs to a live individual or not), the authenticator may indeed be fooled and allow entry/access to the imposter.

One way to reduce the vulnerability of face based authentication systems to replay attacks is to combine face recognition with other modes of biometric authentication (e.g., voice recognition). This makes it more difficult for an imposter to spoof an enrolled user because the imposter must present two or more forms of biometric replay data in order to fool the authenticator (e.g., a photograph/video of the enrolled user's face for face recognition and a recording of the enrolled user's voice for voice recognition). However, with the prevalence of mobile devices such as smartphones, tablets, etc. having built-in displays and microphones, as well as the ease with which photographs and voice recordings can be captured and shared via social media, even combined face and voice based authentication systems are becoming increasingly vulnerable to replay attacks.

Accordingly, it would be desirable to have improved techniques for verifying the liveness of biometric data presented to a face-based authentication system (whether the system relies solely on face recognition or multiple recognition modalities). With such techniques, the authentication system may quickly identify data that is not deemed to be from a live subject as corresponding to a replay attack.

SUMMARY

Techniques for implementing face-controlled liveness verification are provided. In one embodiment, a computing device can present, to a user, a sequential series of targets on a graphical user interface (GUI) of the computing device, where each target is a visual element designed to direct the user's attention to a location in the GUI. The computing device can further determine whether the user has successfully hit each target, where the determining comprises tracking movement of a virtual pointer controlled by the user's gaze or face pose and checking whether the user has moved the virtual pointer over each target. If the user has successfully hit each target, the computing device can conclude that the user is a live subject.

A further understanding of the nature and advantages of the embodiments disclosed herein can be realized by reference to the remaining portions of the specification and the attached drawings.

DETAILED DESCRIPTION

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

The present disclosure describes techniques that can be implemented by a computing device for verifying the liveness of a user authenticating himself/herself with the device using face biometrics (potentially combined with other biometrics). These techniques are collectively referred to herein as "face-controlled liveness verification."

According to one set of embodiments, the computing device can, concurrently with or after authenticating the user via his/her face (and/or other biometrics), present the user with a sequential liveness challenge that involves "hitting" a series of "targets" displayed via a graphical user interface (GUI) of the device. As used herein, a "target" is any visual element in the GUI that is used to direct the user's attention to a particular location. Further, the user "hits" a target by using his/her gaze or face pose to move a "virtual pointer" (which may or may not be displayed on the GUI) to the location of the target in the GUI. For example, the user may move his/her eyes (i.e., use gaze control) to move the virtual pointer over the target. Alternatively, the user may move his entire head/face relative to a camera of the computing device (i.e., use face pose control) to move the virtual pointer over the target.

In one embodiment, the sequential liveness challenge can comprise presenting, by the computing device to the user, a first target that is placed at a first random location in the GUI. Upon determining that the user has successfully used his/her gaze or face pose to move the virtual pointer over the first target, the computing device may present to the user a second target that is placed at a second random location in the GUI. This process may repeat an arbitrary number of times. If the user successfully hits all presented targets (or some subset of the presented targets) in sequence, the computing device can conclude that the user is a live subject and thus grant the user authenticated access to the device.

With the foregoing approach, the vulnerability of the device's authenticator to replay attacks can be significantly reduced, since the gaze or face pose control needed to hit each randomized target will generally be difficult to replicate using a piece of pre-captured or pre-recorded replay media such as a photograph or a video. Varying levels of difficulty and security can be achieved by adjusting the size/shape/location of the targets and/or the length of the sequence. Further, in certain embodiments, the challenge presented to the user can embed additional forms of user knowledge; for instance, the user may be prompted to hit a particular "valid"

target at each step of the sequence, while ignoring other "invalid" targets, according to a secret known only to the user (e.g., a PIN, passphrase, etc.). In these embodiments, the arrangement of the valid targets can still be randomized, but an extra level of security is obtained by requiring knowledge of which target to hit at each step.

These and other aspects of the present disclosure are described in further detail in the sections that follow.

2. System Environment

Figure 1:
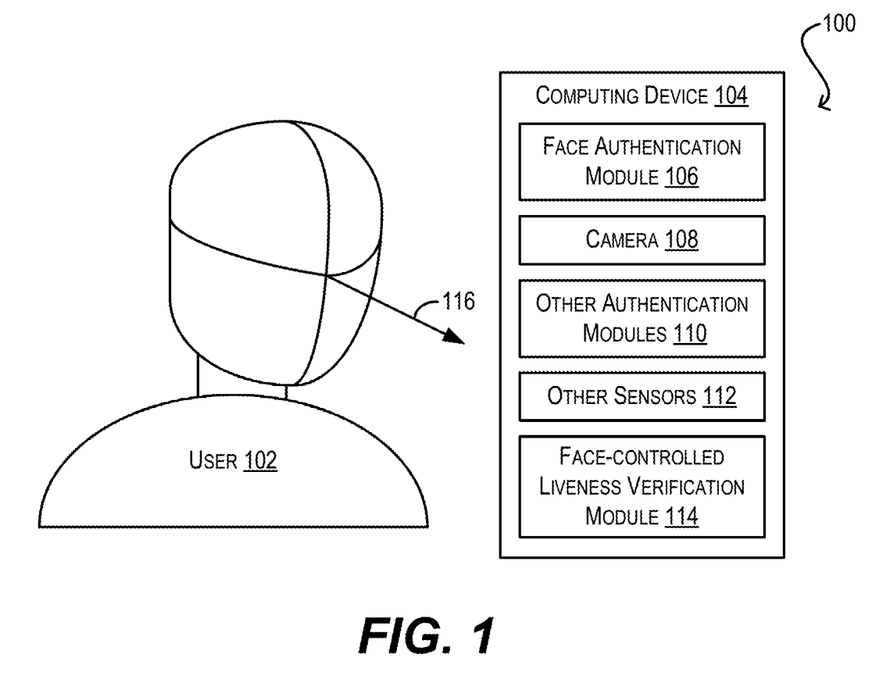
FIG. 1 depicts a system environment according to an embodiment.

FIG. 1 depicts a system environment 100 that supports the face-controlled liveness verification techniques of the present disclosure according to an embodiment. As shown, system environment 100 includes a user 102 and a computing device 104. Computing device 104 can be any type of electronic device that is capable of (either alone or in conjunction with other devices/systems) authenticating user 102 based on his/her face. In one embodiment, computing device 104 can be a mobile device, such as a smartphone, a tablet, a smartwatch, or the like. In other embodiments, computing device 104 can be a larger device or system, such as a desktop computer, a kiosk or ATM machine, an in-vehicle computer system, etc.

To carry out its face based authentication processing, computing device 104 includes a face authentication module 106 and a camera 108. In some embodiments, computing device 104 may also be capable of authenticating user 102 using other biometrics (either separate from, or in combination, with face biometrics). Examples of such other biometrics include voice, fingerprint, retinal pattern, and so on. To that end, computing device 104 can also include one or more other biometric authentication modules 110, as well as corresponding sensors 112 for enabling authentication via modules 110 (e.g., microphone, fingerprint sensor, retinal scanner, etc.).

As noted in the Background section, one drawback with existing face based authentication systems is that they generally rely on a comparison of static facial features between images captured from a user at a point of authentication and an enrolled set of facial templates. As a result, these existing systems are vulnerable to replay attacks in which an imposter presents a still photograph or video of an enrolled user, thereby fooling the systems into believing that the enrolled user is present at the point of authentication.

To address this and other similar issues, computing device 104 of FIG. 1 includes a novel face-controlled liveness verification module 114. Module 114 can be implemented as software that is executed by, e.g., a general-purpose processor of computing device 104, as a dedicated hardware component, or as a combination of software and hardware. As described in further detail below, face-controlled liveness verification module 114 can (concurrently with, or after, authentication of user 102's identity via authentication modules 106 and/or 110) present to user 102 a sequential challenge comprising a series of targets displayed on a GUI of computing device 104. If user 102 hits all (or some predefined subset) of the presented targets by using his/her gaze or face pose 116 to move a virtual pointer over each target in order, module 114 can determine that user 102 is a live subject. On the other hand, if user 102 cannot not hit all of the presented targets, module 114 can determine that user 102 is likely some form of replay media (e.g., a photograph or video) that is being presented by an imposter to spoof a live user. This liveness determination can, in turn, enable computing device 104 to more accurately and quickly authenticate users in the face of potential replay attacks.

It should be appreciated that system environment 100 of FIG. 1 is illustrative and not intended to limit embodiments of the present disclosure. For example, although modules 106, 110, and 114 are shown as executing on computing device 104, in alternative embodiments some portion of the functions attributed to these modules may be performed remotely on another device/system, such as a cloud-based server. Further, the various entities shown in FIG. 1 may have other subcomponents or functions that are not explicitly described. One of ordinary skill in the art will recognize many variations, modifications, and alternatives.

3. Workflows

Figure 2A:
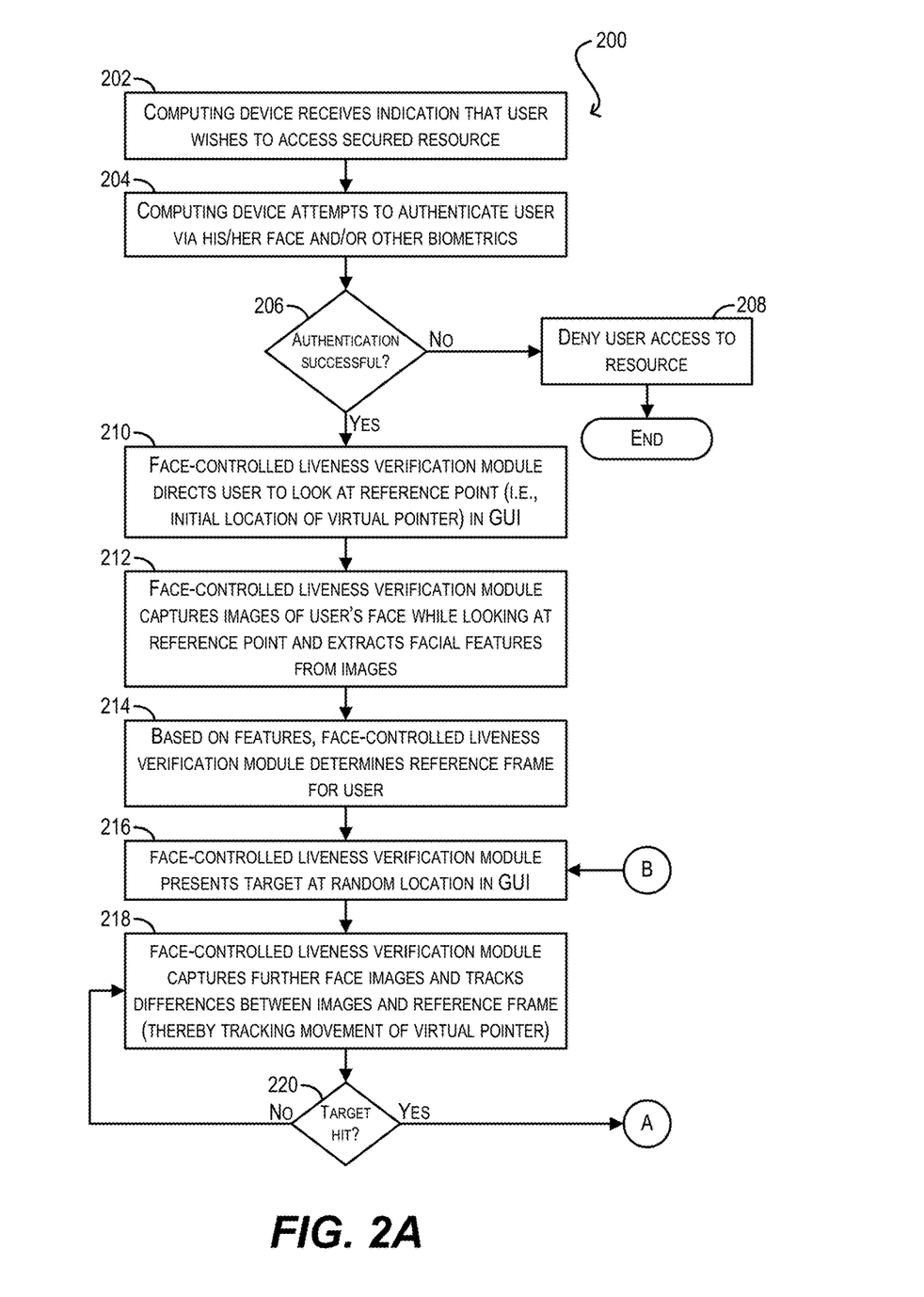
FIGS. 2A and 2B depict a first workflow for implementing face-controlled liveness verification according to an embodiment.
Figure 2B:
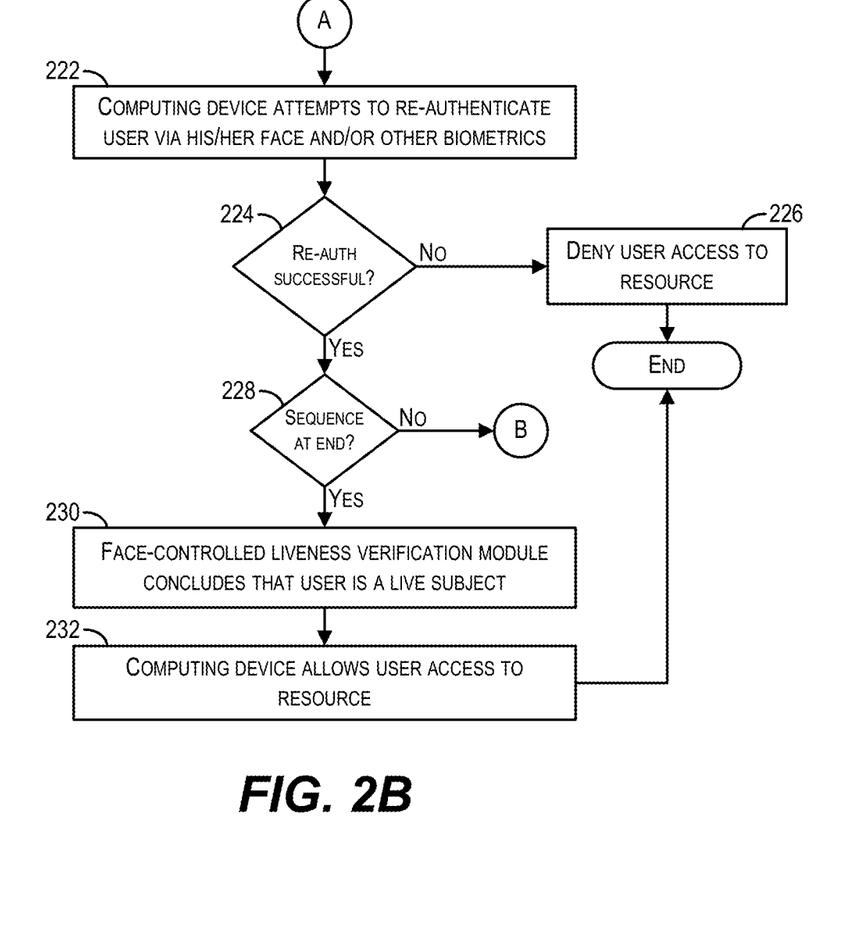

FIGS. 2A and 2B depict a high-level workflow 200 that can be performed by computing device 104 of FIG. 1 for implementing face-controlled liveness verification according to an embodiment.

Starting with block 202 of FIG. 2A, computing device 104 can receive an indication that a user (e.g., user 102) wishes to access a secured resource on computing device 104. For example, user 102 may wish to unlock computing device 104 so that he/she can interact with it, or user 102 may wish to access a particular secured application or file on device 104.

In response, computing device 104 can attempt to authenticate user 102 based on his/her face (via face authentication module 106 and camera 108) and/or based on other biometrics, such as user 102's voice, fingerprint, etc. (via other authentication modules 110 and other sensors 112) (block 204). For example, as part of block 204, computing device 104 can capture one or more images of user 102's face via camera 108. Face authentication module 106 can then evaluate (using, e.g., conventional face recognition techniques) the captured images against a set of enrolled facial templates and thereby determine whether the facial features in the images are close enough to a particular template to indicate that user 102 is an enrolled user. As another example, as part of block 204, computing device 104 can capture a recording of user 102's voice via a microphone of device 104. A voice authentication module of device 104 can then evaluate (using, e.g., conventional voice recognition techniques) the recording against a set of enrolled speaker models and thereby determine whether the voice characteristics in the recording are close enough to a particular speaker model to indicate that user 102 is an enrolled user.

If authentication modules 106/110 of computing device 104 determine that user 102 cannot be successfully authenticated based on his/her face and/or other biometrics (block 206), device 104 can deny user 102 access to the secured resource (block 208) and workflow 200 can end.

However, if authentication modules 106/110 determine that user 102 can be successfully authenticated based on his/her face and/or other biometrics (block 206), computing device 104 can proceed to carry out a face-controlled liveness verification challenge using face-controlled liveness verification module 114 per the remaining blocks of FIGS. 2A and 2B.

In particular, at block 210, face-controlled liveness verification module 114 can first direct user 102 to look at a reference point in a GUI of computing device 104. The reference point may be located at, e.g., the center of the GUI or some other known location, and indicates the initial location of a "virtual pointer" that user 102 will manipulate with his/her gaze or face pose during the challenge.

At block 212, face-controlled verification module 114 can capture a sequence of images of user 102's face (via camera 108) while he/she is looking at the reference point, and can extract facial features from the captured images. Examples of such features include the user's eyes, pupils, and other facial landmarks. Based on the state of these features, face-controlled liveness verification module 114 can determine a "reference frame" for user 102, which indicates the user's face pose and/or gaze when looking at the reference point (and thus, the initial position of the virtual pointer) (block 214).

Then, at block 216, face-controlled liveness verification module 114 can present a target at a random location in the GUI of device 104. As mentioned previously, this target can represent any visual element in the GUI that is used to direct user 102's attention to the location of the target. For example, the target may be a geometric shape, a letter/word, a number, a picture, etc. Upon presenting the target, face-controlled liveness verification module 114 can capture, using camera 108, further images of user 102's face and track the differences between the user's facial features in these images and the reference frame (block 218). In this way, module 118 can calculate how far, and in which direction, user 102 is moving the virtual pointer in the GUI using his/her gaze or face pose. It should be noted that there are many different ways in which user 102's gaze or face pose can be measured and tracked at block 218, and the embodiments described herein are not intended to be limited to any particular measurement/tracking technique.

At block 220, face-controlled liveness verification module 114 can determine whether user 102 has successfully "hit" (i.e., moved the virtual pointer over, or onto) the target presented at block 216. In one embodiment, module 114 can register a hit if user 102 is able to guide the virtual pointer over the target using his/her gaze or face pose for any period of time. In other embodiments, module 114 may require user 102 to hover the virtual pointer over the target for a specified duration (e.g., 1 second). In other embodiments, module 114 may impose yet further requirements in order to register a hit, such as requiring the user to use his/her gaze or face pose to follow a specific trajectory (e.g., an arc or zigzag) on the way to the target, requiring the user maintain a certain speed or speed range when following the trajectory (or performing any control action), and so on.

If the target is not hit, face-controlled liveness verification module 114 can return to block 218 and continue tracking user 102's gaze or face pose. Although not shown in the figures, if user 102 is not able to hit the target after a predefined period of time (e.g., 10 seconds), module 114 can conclude that the user is not a live subject and the workflow can immediately end.

On the other hand, if the target is hit at block 220, workflow 200 can proceed to block 222 of FIG. 2B, where face-controlled liveness verification module 114 can cause device 104 to re-authenticate user 102 via the biometric techniques described with respect to block 204 of FIG. 2A. By performing this authentication again, module 114 can ensure that the user completing the liveness challenge is that same user that was initially authenticated prior to the challenge.

If the re-authentication fails (block 224), computing device 104 can deny user 102 access to the secured resource (block 226) and workflow 200 can end.

If the re-authentication succeeds, face-controlled liveness verification module 114 can subsequently check whether the current challenge sequence has reached its end, or should continue (block 228). This check can be based on, e.g., a sequence length that is determined randomly by module 114, or based on one or more criteria (e.g., the nature of the secured resource, the identity of user 102, the authentication score calculated at block 222 and/or 204, etc.). As mentioned previously, the sequence length can be varied to provide more or less difficulty and security.

If the current challenge sequence has not yet reached its end, face-controlled liveness verification module 114 can return to block 216 of FIG. 2A and thereby present additional targets to user 102. Otherwise, module 114 can conclude that user 104 is a live subject (block 230). Computing device 104 can then grant user 102 access to the secured resource (block 232) and workflow 200 can end.

It should be appreciated that workflow 200 is illustrative and various modifications are possible. For example, while the liveness challenge in workflow 200 is presented in the context of a user authentication event, the same (or similar) challenge may be implemented during user enrollment in order to train the user being enrolled and to collect a more varied set of enrolled face images.

As another example, in some embodiments an adaptive enrollment process can be carried out simultaneously with the liveness challenge. This adaptive enrollment process can dynamically pull face images of the user that are collected while he/she is completing the challenge.

As yet another example, in some embodiments more dramatic face poses and/or eye movements can be required by the challenge in order to obtain higher security (at the cost of usability). This can help prevent curved photo attacks where some pose variability can be achieved.

As yet another example, although workflow 200 assumes that user 102 is authenticated at blocks 204/206 prior to initiating the liveness challenge, in some embodiments the liveness challenge and general authentication of user 102's identity can occur simultaneously. For instance, in these embodiments user 102 can be immediately presented the liveness challenge and access to the secured resource would be granted at the end only if the user passed the challenge and satisfied the general authentication requirements during the challenge.

Figure 3:
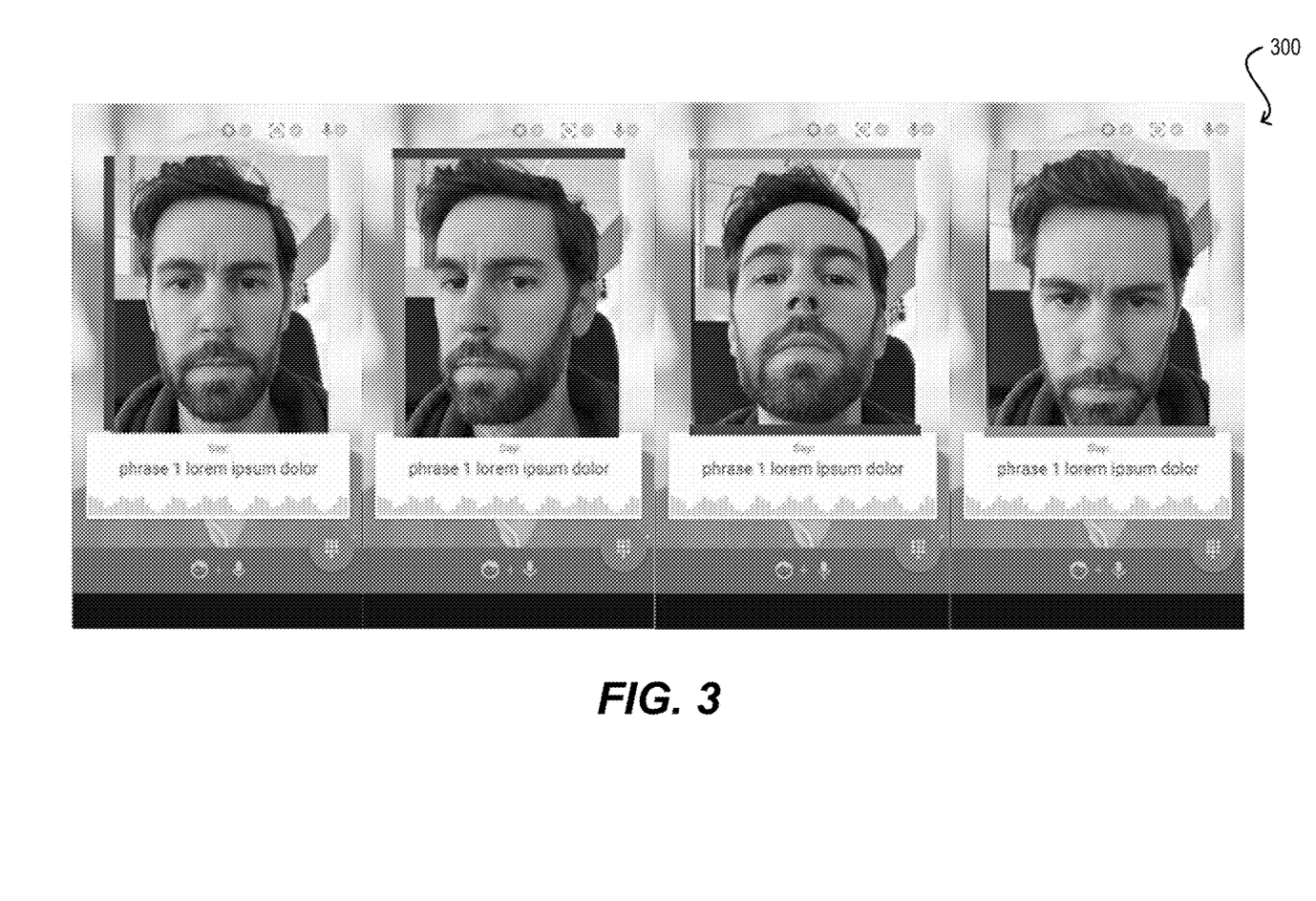
FIG. 3 depicts a sequence of user interfaces that may be generated in the workflow of FIG. 2 according to an embodiment.

To clarify the operation of workflow 200, FIG. 3 depicts an exemplary series of GUIs 300 that may be generated by computing device 104 per workflow 200 according to an embodiment. In this example, the challenge sequence comprises three targets, and each target is a dark gray bar that appears randomly at one of four locations of the GUI (left, right, top, bottom). As shown, the user adjusts his face pose/gaze to direct an invisible virtual pointer to each target. When the target is hit, the target turns a lighter shade of gray and a new target is presented. In addition, at each step of the challenge, the user is presented with a phrase (i.e., "lorem ipsum dolor") that he is required to speak in order to verify his identity at that step via voice recognition.

Figure 4A:
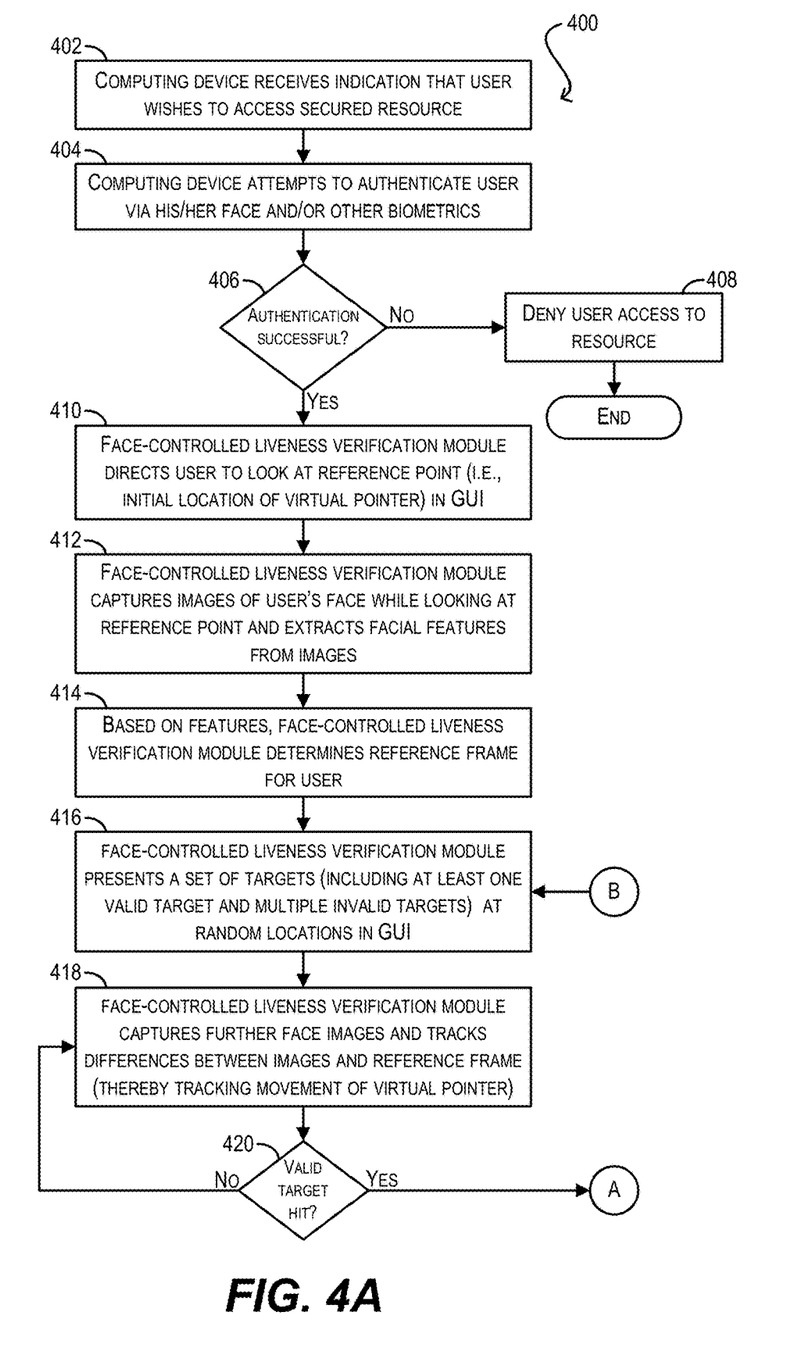
FIG. 4A depicts a second workflow for implementing face-controlled liveness verification according to an embodiment.

As mentioned previously, in certain embodiments, the sequence of targets presented to user 102 in workflow 200 can be enhanced to embed a user secret (e.g., a PIN, passphrase, etc.). With this enhancement, an additional level of security can be achieved, since the user must know the secret (in addition to being able to hit targets) in order to successfully complete the challenge. FIG. 4A depict a modified version of workflow 200 (400) that illustrates this enhancement according to an embodiment.

Blocks 402-414 of workflow 400 are substantially similar to blocks 202-214 of workflow 200. At block 416, face-controlled liveness verification module 114 can present a set of targets in the GUI of computing device 104 (rather than a single target as in block 216 of workflow 200). This set of targets can include one "valid" target and a number of "invalid" targets, where the valid target corresponds to a secret known by user 102. For instance, each presented target may be a digit, and the valid target may correspond to the first digit of a secret PIN of user 102 (with the invalid targets being other, random digits).

At block 420, face-controlled liveness detection module 114 can check whether user 102 has correctly hit the valid target. If so, workflow 400 can continue in a manner similar to the remaining blocks of workflow 200 as shown in FIG. 2B, and module 114 may present additional sets of targets at subsequent steps of the challenge (where each additional set includes a single valid target, such as subsequent digits in user 102's PIN). If user 102 is able to correctly hit all valid targets in the sequence, computing device 114 can conclude that user 102 is a live subject and thus grant the user access to the secured resource.

On the other hand, if user 102 is not able to hit the valid target at one or more steps of the challenge, face-controlled liveness verification module 114 can conclude that user 102 is not a live subject and thus deny access to the resource.

4. Exemplary Computing Device

Figure 5:
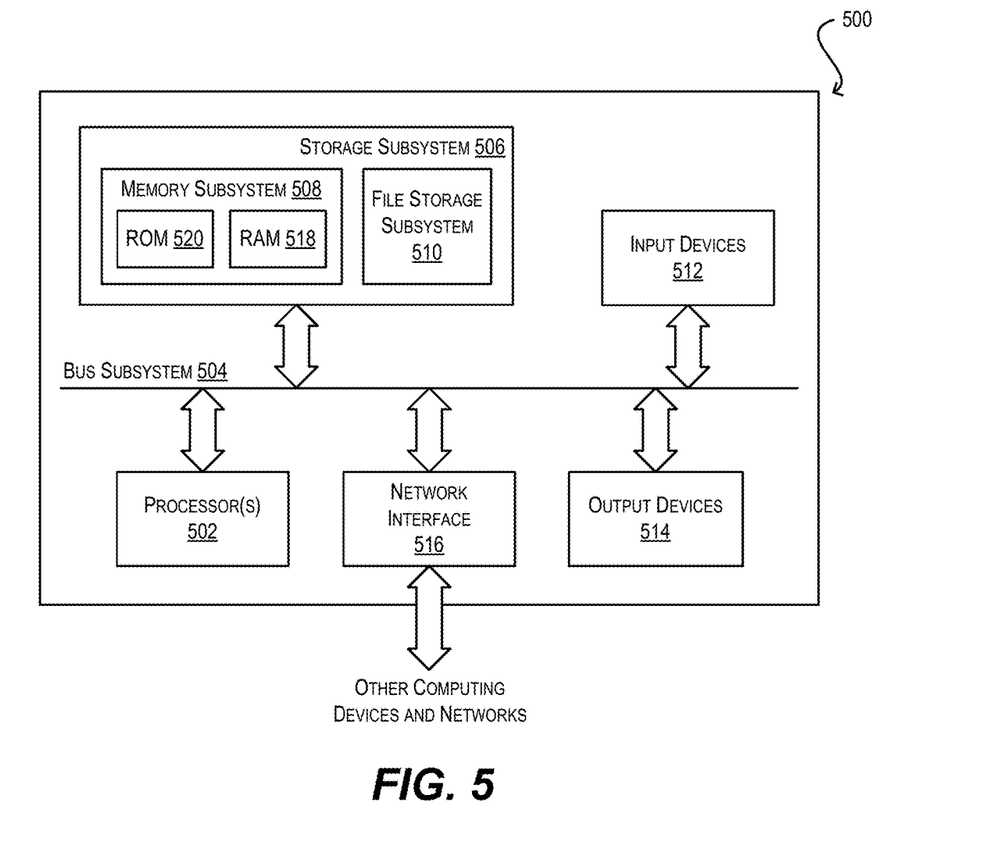
FIG. 5 depicts a computing device according to an embodiment.

FIG. 5 is a simplified block diagram of a computing device 500 that may be used to implement the foregoing embodiments of the present disclosure. As shown, computing device 500 includes one or more processors 502 that communicate with a number of peripheral devices via a bus subsystem 504. These peripheral devices include a storage subsystem 506 (comprising a memory subsystem 508 and a file storage subsystem 510), input devices 512, output devices 514, and a network interface subsystem 516.

Bus subsystem 504 can provide a mechanism for letting the various components and subsystems of computing device 500 communicate with each other as intended. Although bus subsystem 504 is shown schematically as a single bus, alternative embodiments of the bus subsystem can utilize multiple buses.

Network interface subsystem 516 can serve as an interface for communicating data between computing device 500 and other computing devices or networks. Embodiments of network interface subsystem 516 can include wired (e.g., coaxial, twisted pair, or fiber optic Ethernet) and/or wireless (e.g., Wi-Fi, cellular, Bluetooth, etc.) interfaces.

Input devices 512 can include a camera (such as camera 108 of FIG. 1), a touch-screen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computing device 500.

Output devices 514 can include a display subsystem (e.g., a flat-panel display), an audio output device (e.g., a speaker), and/or the like. In general, use of the term "output device" is intended to include all possible types of devices and mechanisms for outputting information from computing device 500.

Storage subsystem 506 includes a memory subsystem 508 and a file/disk storage subsystem 510. Subsystems 508 and 510 represent non-transitory computer-readable storage media that can store program code and/or data that provide the functionality of various embodiments described herein.

Memory subsystem 508 can include a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 500 is illustrative and not intended to limit embodiments of the present invention. Many other configurations having more or fewer components than computing device 500 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   receiving, by a computing device from a user, an indication that the user wishes to access a secured resource on the computing device;
   attempting, by the computing device, to authenticate the user a first time based on first facial biometric data presented by the user to a face-based authentication system of the computing device; and
   if the attempting to authenticate the user the first time is successful:
      directing, by the computing device, the user to look at a reference point in a graphical user interface (GUI) of the computing device, the reference point corresponding to an initial location of a virtual pointer;
      capturing, by the computing device, one or more images of a face of the user while the user is looking at the reference point;
      determining, by the computing device based on the one or more images, a reference frame for the user indicating a first gaze or a first face pose of the user when looking at the reference point;
      presenting, by the computing device to the user, a sequential series of pluralities of targets on the GUI, each target being a visual element designed to direct the user's attention to a location in the GUI, wherein at each step in the sequential series the plurality of targets for the step includes a valid target and an invalid target, wherein the valid target corresponds to a secret known to the user, and wherein the number of steps in the sequential series is based upon one or more criteria pertaining to the secured resource;
      determining, by the computing device, whether the user has successfully hit the valid targets in the sequential series by checking whether the user has moved the virtual pointer over the valid targets, the checking comprising:

capturing one or more further images tracking movement of the user's face; and comparing a gaze or a face pose of the user in each of the one or more further images against the first gaze or the first face pose in the reference frame in order to determine how far and in which direction the user has moved the virtual pointer from the reference point;

if the user has successfully hit the valid targets, attempting, by the computing device, to authenticate the user a second time based on second facial biometric data presented by the user to the face-based authentication system;

if the attempting to authenticate the user the second time fails, denying, by the computing device, the user access to the secured resource; and if the attempting to authenticate the user the second time is successful, concluding, by the computing device, that the user is a live subject and granting the user access to the secured resource.

2. The method of claim 1 further comprising: if the user is not able to successfully hit the valid targets, concluding that the user is not a live subject and denying the user access to the secured resource.

3. The method of claim 1 wherein the attempts to authenticate the user the first and second times are further based on first and second voice biometric data presented by the user to a voice-based authentication system of the computing device.

4. The method of claim 1 wherein the plurality of targets are presented at random locations in the GUI.

5. The method of claim 1 wherein determining whether the user has successfully hit the valid targets further comprises determining whether the user has hovered the virtual pointer over the valid targets for a predefined duration.

6. The method of claim 1 wherein determining whether the user has successfully hit the valid targets further comprises determining whether the user has followed a predefined trajectory to the valid targets.

7. The method of claim 1 wherein the number of targets in the sequential series is further based upon one or more criteria pertaining to the user or.

8. The method of claim 1 wherein the virtual pointer is not visible to the user.

9. The method of claim 1 wherein the presenting is performed during a face enrollment process for the user.

10. The method of claim 1 further comprising, while the user is attempting to hit the valid targets:

adding the one or more further images to a face template of the user.

11. The method of claim 1, wherein determining whether the user has successfully hit the valid targets comprises:

determining whether the user has successfully hit each valid target, without hitting any invalid targets.

12. A non-transitory computer readable medium having stored thereon program code executable by a processor of a computing device, the program code comprising:

code that causes the processor to receive, from a user, an indication that the user wishes to access a secured resource on the computing device;

code that causes the processor to attempt to authenticate the user a first time based on first facial biometric data presented by the user to a face-based authentication system of the computing device; and if the attempt to authenticate the user the first time is successful:

code that causes the processor to direct the user to look at a reference point in a graphical user interface (GUI) of the computing device, the reference point corresponding to an initial location of a virtual pointer;

code that causes the processor to capture one or more images of a face of the user while the user is looking at the reference point;

code that causes the processor to determine, based on the one or more images, a reference frame for the user indicating a first gaze or a first face pose of the user when looking at the reference point;

code that causes the processor to present to the user, a sequential series of pluralities of targets on the GUI, each target being a visual element designed to direct the user's attention to a location in the GUI, wherein at each step in the sequential series the plurality of targets for the step includes a valid target and an invalid target, wherein the valid target corresponds to a secret known to the user, and wherein the number of steps in the sequential series is based upon one or more criteria pertaining to the secured resource;

code that causes the processor to determine whether the user has successfully hit the valid targets in the sequential series by checking whether the user has moved the virtual pointer over the valid targets, the checking comprising:

capturing one or more further images tracking movement of the user's face; and comparing a gaze or a face pose of the user in each of the one or more further images against the first gaze or the first face pose in the reference frame in order to determine how far and in which direction the user has moved the virtual pointer from the reference point;

if the user has successfully hit the valid targets, code that causes the processor to attempt to authenticate the user a second time based on second facial biometric data presented by the user to the face-based authentication system;

if the attempt to authenticate the user the second time fails, code that causes the processor to deny the user access to the secured resource; and if the attempt to authenticate the user the second time is successful, code that causes the processor to conclude that the user is a live subject and grant the user access to the secured resource.

13. A computing device comprising:

a camera;

a display;

a processor; and a memory having stored thereon program code which, when executed by the processor, causes the processor to:

receive, from a user, an indication that the user wishes to access a secured resource on the computing device;

attempt to authenticate the user a first time based on first facial biometric data presented by the user to a face-based authentication system of the computing device; and if the attempt to authenticate the user the first time is successful:

direct the user to look at a reference point in a graphical user interface (GUI) shown on the display, the reference point corresponding to an initial location of a virtual pointer;

capture one or more images of a face of the user via the camera while the user is looking at the reference point;

determine, based on the one or more images, a reference frame for the user indicating a first gaze or a first face pose of the user when looking at the reference point;

present, to the user, a sequential series of pluralities of targets on the GUI, each target being a visual element designed to direct the user's attention to a location in the GUI, wherein at each step in the sequential series the plurality of targets for the step includes a valid target and an invalid target, wherein the valid target corresponds to a secret known to the user, and wherein the number of steps in the sequential series is based upon one or more criteria pertaining to the secured resource;

determine whether the user has successfully hit the valid targets in the sequential series by checking whether the user has moved the virtual pointer over the valid targets, the checking comprising:

capturing one or more further images tracking movement of the user's face; and comparing a gaze or a face pose of the user in each of the one or more further images against the first gaze or the first face pose in the reference frame in order to determine how far and in which direction the user has moved the virtual pointer from the reference point;

if the user has successfully hit the valid targets, attempt to authenticate the user a second time based on second facial biometric data presented by the user to the face-based authentication system;

if the attempt to authenticate the user the second time fails, deny the user access to the secured resource; and if the attempt to authenticate the user the second time is successful, conclude that the user is a live subject and grant the user access to the secured resource.

\* \* \* \* \*